May 30, 1972 J. R. WILLIAMS 3,666,328
WHEEL ANTI-LOCK CONTROL SYSTEM
Filed Oct. 9, 1970 2 Sheets-Sheet 2

INVENTOR.
John R. Williams
BY
D. D. McGraw
ATTORNEY

United States Patent Office 3,666,328
Patented May 30, 1972

3,666,328
WHEEL ANTI-LOCK CONTROL SYSTEM
John R. Williams, Dayton, Ohio, assignor to General Motors Corporation, Detroit, Mich.
Filed Oct. 9, 1970, Ser. No. 79,474
Int. Cl. B60t 8/02
U.S. Cl. 303—21 F    4 Claims

ABSTRACT OF THE DISCLOSURE

A wheel anti-lock control system wherein the size of the modulator piston supporting spring is minimized by providing a hydraulic piston supporting pressure consisting of the back-pressure created by an open center hydraulic brake booster.

---

The present invention relates to a wheel anti-lock control system and more particularly to a wheel anti-lock control system in which an open center hydraulic pressure operated brake booster and an open center control valve cooperate to control a fluid pressure modulator in such a manner as to assist the modulator piston supporting spring in holding the modulator valve unseated during normal braking conditions.

It is desirable in a wheel anti-lock control system to provide a fluid pressure modulator having a spring supported piston which will unseat the modulator valve in the event of a loss of modulator operating fluid pressure so as to prevent closing of the modulator valve and consequent loss of brake control by the vehicle operator. It is also desirable to package the modulator unit as compactly as possible to satisfy economic and physical size limitations. It is therefore desirable to minimize the size of the supporting spring required to hold the modulator valve unseated against the force of the braking fluid pressure acting against the piston plunger. The present invention provides an improved anti-lock modulator and control circuit which minimizes the size of the modulator piston supporting spring by providing a hydraulic supporting force for the piston which is proportional to the braking fluid pressure.

The wheel brake control system of this invention includes a hydraulic booster of the open center type which operates a master cylinder. In such a booster the operating fluid flows unrestricted through the booster until pedal actuation causes a flow restriction which, by creating a pressure increase, operates the booster and in turn the master cylinder. Master cylinder generated brake fluid pressure is communicated directly to one pair of vehicle wheel brakes and to a second pair of vehicle wheel brakes through a fluid pressure modulator. The fluid pressure modulator includes a spring supported piston which normally holds a modulator valve unseated to allow free communication of brake fluid between the master cylinder and the vehicle wheel brakes. Hydraulic fluid received from a constant flow pump such as the power steering pump is supplied to an open center control valve which channels the fluid to both sides of the modulator piston. The hydraulic booster receives operating fluid from one side of the modulator piston. When the hydraulic booster is actuated, fluid flow through the hydraulic booster is restricted causing a pressure increase at the inlet side of the hydraulic booster, on the one side of the modulator piston which communicate directly therewith and on the other side of the piston through the open center modulator control valve. The differential areas between the two sides of the modulator piston result in a net force acting on the piston in a direction assisting the supporting spring. Since the flow restriction and consequent pressure increase on the modulator piston is proportional to the degree of pedal actuation and thus the magnitude of braking pressure generated by the master cylinder, the supporting force applied to the modulator piston increases as the brakes are progressively applied to maintain the unseated position of the modulator valve against the force of the braking pressure acting against the cross section of the modulator plunger.

Figure 1:
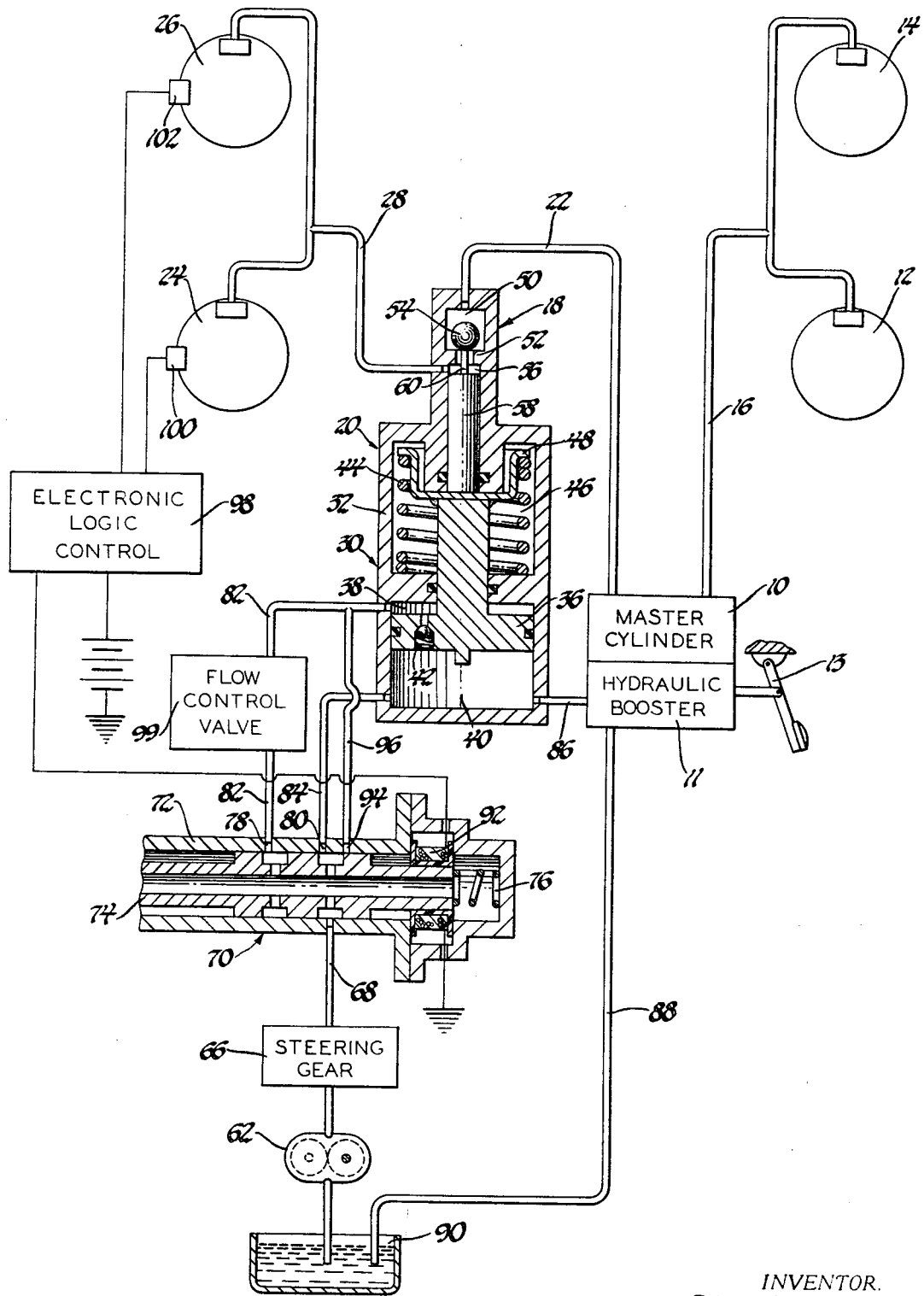
FIG. 1 is a schematic representation of the wheel control system showing a sectional view of the fluid pressure modulator and open center control valve.

The master cylinder 10 is operatively engaged by the hydraulic booster 11. Hydraulic booster 11 is of the open center type in which the hydraulic operating fluid flows unrestricted through the booster until pedal 13 is actuated causing a booster actuating pressure increase by restricting the fluid flow. Master cylinder 10 is illustrated as being of the dual master cylinder type with one chamber being connected to the front wheel brakes 12 and 14 by conduit 16. The other chamber of the master cylinder 10 is connected to the rear wheel brakes 24 and 26 through conduit 22, valve section 18 of the modulator assembly 20, and conduit 28.

The piston section 30 of modulator 20 includes a housing 32 in which piston 36 is located. Piston 36 forms a power wall which divides piston section 30 into variable pressure chambers 38 and 40. Piston 36 includes a check valve assembly 42 which communicates pressurized fluid from variable pressure chamber 38 to variable pressure chamber 40 when unseated. Piston 36 sealingly extends through to housing 32 into spring chamber 46. Supporting spring 44 is located within spring chamber 46 and engages retainer 48 which is attached to piston 36.

The valve section 18 of the modulator 20 includes a valve chamber 50. Annular valve seat 52 is formed in the lower end of the valve chamber 50. Modulator valve 54, illustrated as being a ball-type valve, is located in the valve chamber 50 so that in its lower position it is seated at valve seat 52 and prevents fluid flow from the valve chamber 50 which communicates with conduit 22 to the plunger chamber 56 which communicates with conduit 28. Plunger 58 forms a fluid displaceable means which is reciprocably mounted in housing 32. The upper end of plunger 58 forms pin 60 which extends through plunger chamber 56 and annular valve seat 52 to operatively engage modulator valve 54. The lower end of plunger 58 sealingly extends through the housing 32 into spring chamber 56 where it engages the spring retainer 48 of the piston 36 in free abutting relationship. Spring 44 biases spring retainer 48, the attached piston 36, and the abutting plunger 58 in a direction tending to unseat modulator valve 54 from the annular valve seat 52, thereby permitting free fluid passage from master cylinder 10 to the rear wheel brakes 24 and 26.

Constant flow pump 62, illustrated as being a power steering pump, provides operating fluid for the modulator 20 and the open center hydraulic booster 11. Power steering gear 66 receives operating fluid from pump 62. Conduit 68 communicates the operating fluid from the power steering gear 66 to the modulator control valve assembly 70.

Modulator control valve 70 selectively channels operating fluid to the variable pressure chambers 38 and 40 to operate the modulator 20 in accordance with the sensed wheel condition. Modulator control valve 70 includes a housing 72 in which valve spool 74 is slidably received. Spring 76 is seated against valve housing 72 and acts against the valve spool 74 urging it to an open center position in which operating fluid from conduit 68 is communicated through valve ports 78 and 80 to the conduits 82 and 84 respectively and to the variable pressure chambers 38 and 40 communicating respectively therewith. Flow control valve 99, located in conduit 82, permits free fluid flow to variable pressure chamber 38 and meters fluid flow from chamber 38. Conduit 86 connects the variable pressure chamber 40 of modulator 20 and the open center hydraulic booster 11. Conduit 88 returns the operating fluid to the fluid sump 90 thereby completing the operating fluid circuit. Modulator control valve 70 is illustrated as being a solenoind operated valve. The solenoid coil 92 located within valve housing 72 is energizable to shift the valve spool 74 in a direction causing spring 76 to collapse. Valve port 94 is thereby opened and valve ports 78 and 80 closed. The fluid flow from pump 62 is thereby communicated from conduit 68 to conduit 96 which is connected to the variable pressure chamber 38.

The electronic logic control 98 senses the wheel acceleration condition through appropriate wheel velocity sensors 100 and 102, and provides an electric signal which operates the solenoid 92 of the modulator control valve 70.

OPERATION

During the brake release condition and normal brake operating condition, the modulator 20 and modulator control valve 70 are positioned as shown in FIG. 1. When the brakes are not applied, the operating fluid flow generated by pump 62 is communicated through the power steering gear 66, through the open center modulator control valve 70 to both the variable pressure chambers 38 and 40, and through the open center hydraulic booster 11 and conduit 88 to sump 90. Since the fluid flow through the hydraulic booster 11 is unrestricted, the pressure of the operating fluid in the modulator and booster circuit is substantially zero.

Upon actuation of the brake pedal 13, the flow of operating fluid through the hydraulic booster 11 is restricted causing a pressure increase which operates the booster and consequently the master cylinder 10. The brake fluid pressure generated upon actuation of the master cylinder by the hydraulic booster is communicated to the front wheel brakes through conduit 16 and to the rear wheel brakes through conduit 22, valve chamber 50, plunger chamber 56, and conduit 28. The brake fluid pressure acts downward on the upper cross-section of plunger 58 tending to move plunger 58 and piston 36 downward. Actuation of the hydraulic booster 11 also causes a back-pressure increase in conduit 86 and variable pressure chamber 40 which is communicated back through the open center modulator control valve 70 to the variable pressure chamber 38. The operating fluid back-pressure created by actuation of hydraulic booster 11 is proportional to the brake fluid pressure and acts on the differential areas of piston 36 within variable pressure chambers 38 and 40 to consistently provide a net upward acting force which holds modulator valve 54 unseated against the downward acting force of the braking pressure.

When the wheel brakes have been applied to such an extent that an impending wheel lock condition is reached, the electronic logic control 98 generates an electric signal which operates solenoid 92 to shift valve spool 74. The valve spool 74 shifts rightwardly from its position shown in FIG. 1 to block ports 78 and 80 and open port 94. Fluid flow generated by pump 62 is thereby communicated only to variable pressure chamber 38 through conduit 96. The termination of fluid flow to variable pressure chamber 40 allows the pressure in variable pressure chamber 38 to overcome piston supporting spring 44 causing piston 36 to move downward. Downward movement of piston 36 allows the plunger 58 to move downward under the influence of the brake pressure acting on the upper cross-section thereof and allows modulator valve 54 to seat thereby isolating the rear wheel brakes from the master cylinder generated brake pressure. Further withdrawal of plunger 58 increases the volume of plunger chamber 56 and thereby decreases the fluid pressure in conduit 28 to release the rear wheel brakes 26 and 24. This downward movement of piston 36 displaces the operating fluid in variable pressure chamber 40 through conduit 86 to provide operating fluid to the hydraulic booster 11. If piston 36 is fully withdrawn and its downward travel limited by engagement with housing 32 of the modulator, the pump generated fluid pressure in variable pressure chamber 38 unseats check valve 42 so that flow of operating fluid to the hydraulic booster 11 is not interrupted. Since the flow of operating fluid to the hydraulic booster is not interrupted, the brake pedal 33 is not affected by operation of the wheel anti-lock control system.

When the impending wheel lock condition has been arrested, the electrical signal from the electronic logic control 98 is removed and the consequent deenergization of the solenoid coil 92 permits spring 76 to return valve spool 74 to the open center position. Port 94 is thereby blocked and ports 78 and 80 opened. The operating fluid pressure in variable pressure chambers 38 and 40 is thereby equalized permitting spring 44 and the force resulting from the differential area of piston 36 to move piston 36 and the abutting plunger 58 upwardly displacing brake fluid from the plunger chamber 56 to re-apply the wheel brakes 24 and 26 and subsequently unseating modulator valve 54 to restore free fluid communication between the master cylinder 10 and the rear wheel vehicle brakes 26 and 24. Flow control valve 99 meters fluid flow from the variable pressure chamber 38 to control the rate of movement of piston 36 and consequently the rate of braking pressure increase which re-applies the rear wheel vehicle brakes 24 and 26.

The open center hydraulic booster 11 is preferably of a construction which permits follow-through of the booster components to mechanically actuate the master cylinder upon loss of opearting fluid pressure. It is therefore desirable that the modulator supporting spring 44 be sized to resist the force of manually generated master cylinder pressure acting downward on the upper surface of plunger 58 so that the modulator valve 54 is held unseated in the event of failure of the pump 62 so that brake operation is not interrupted. The spring 44 need be sized to withstand only this amount of force since upon normal actuation of the hydraulic booster the resulting back-pressure provides a piston supporting force which increases proportionately to the increase in master cylinder pressure to provide a net upward balancing force holding modulator valve 54 unseated.

Figure 2:
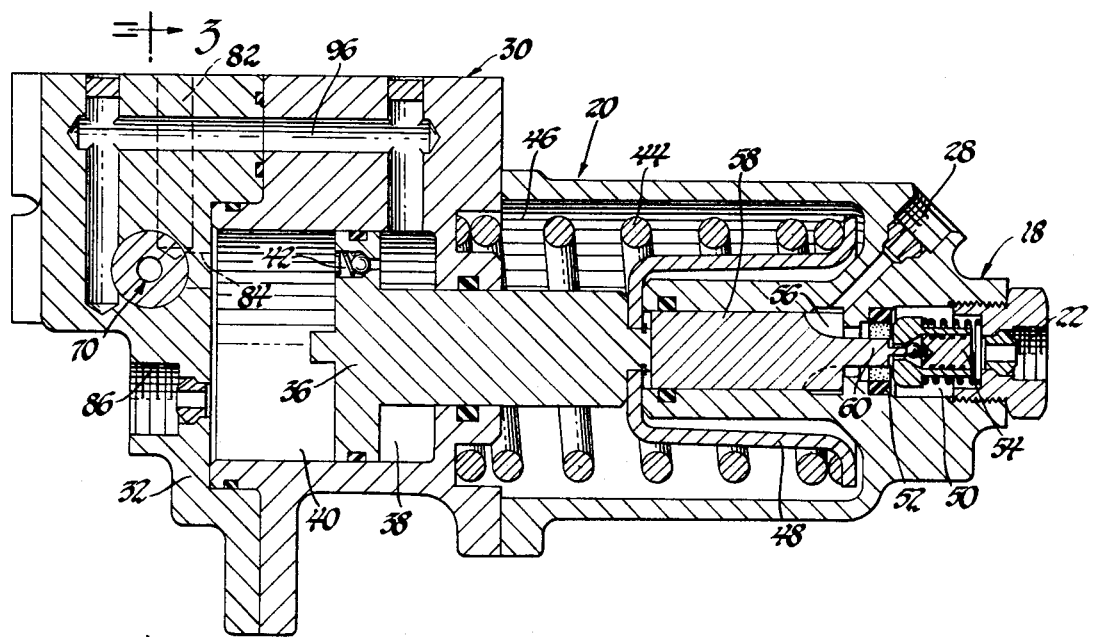
FIG. 2 is a cross-section view of the preferred embodiment of the fluid pressure modulator and open center control valve.
Figure 3:
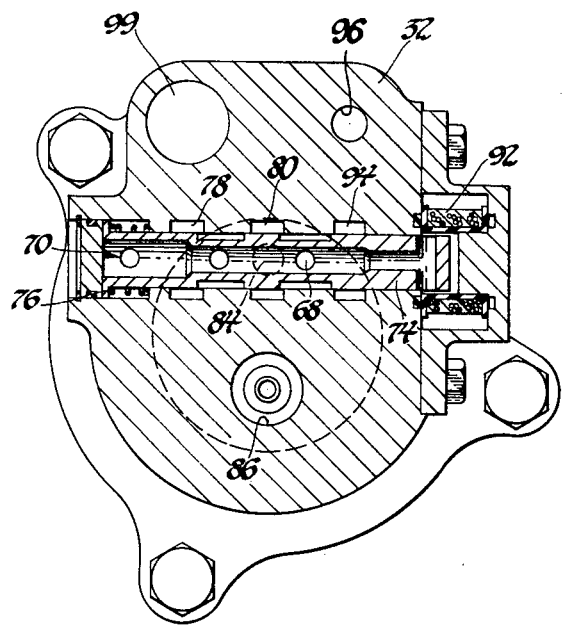
FIG. 3 is a cross-section view taken in the direction of arrows 3—3 of FIG. 2.

Referring to FIGS. 2 and 3, a preferred embodiment of the schematically represented modulator and modulator control valve of FIG. 1 is illustrated. In the preferred embodiment, the modulator 20, modulator control valve 70, and flow control valve 99 are integrally housed in housing 32. The various elements of the modulator and modulator control valve are numbered consistent with the numbers assigned in the schematic illustration of FIG. 1. In the preferred embodiment of FIGS. 2 and 3, the modulator valve 54 is illustrated as being of the type disclosed and claimed in U.S. Pat. No. 3,401,987, granted to Robert A. Horvath and assigned to the common assignee.

It is noted that while the invention is herein disclosed as having a pair of unmodulated wheel brakes and a second pair of wheel brakes controlled by a single modulator and modulator control valve, it is within the scope of this invention to use a plurality of modulator and modulator control valve units to control the wheel brakes singularly or in any desired combination.

What is claimed is:
1. A vehicle wheel brake control system comprising:
  a vehicle wheel means having a fluid pressure actuated braking means;

a master cylinder for generating braking fluid pressure;
a fluid pressure generating means for providing operating fluid;
conduit means fluidly connecting said master cylinder and said braking means;
a fluid pressure modulator for controlling braking fluid pressure delivered to said braking means to control wheel-to-road slip including:
   a modulator valve section connected in said conduit means intermediate said master cylinder and said braking means and having a modulator valve allowing fluid communication therebetween when unseated,
   and a modulator piston section having a differential area piston located therein for reciprocal movement in response to variations in operating fluid pressure, a plunger engaging said piston and extending into said valve section and engaging said modulator valve, and a supporting spring biasing said piston in one direction to hold said modulator valve unseated;
a modulator control valve means for controlling the delivery of operating fluid to said modulator piston section, said modulator control means being in normal open center relation to channel operating fluid received from said fluid pressure generating means to both sides of said piston;
a wheel condition sensing means connected to said modulator control valve means;
an open-center hydraulic booster operatively engaging said master cylinder and receiving operating fluid from one side of said modulator piston, whereby upon hydraulic booster actuation pressure is increased on said one side of said modulator piston and channeled through said modulator control valve to the other side and acting against the differential area piston assists said supporting spring in holding said modulator valve unseated against the master cylinder generated fluid pressure acting on said plunger;
said modulator control valve means being shifted by said wheel condition sensing means when an incipient wheel locking condition is sensed to block fluid communication from said fluid pressure generating means to said one side of said piston and channeling fluid to the other side of said piston causing said supporting spring to be overcome withdrawing said piston thereby seating said modulator valve and increasing the volume of said conduit means to release said braking means, withdrawal of said piston displacing fluid from said one side of said piston to provide operating fluid for said hydraulic booster;
said piston moving in said one direction to decrease the volume of said conduit means to increase the pressure in said conduit means and to unseat said modulator valve when said modulator control valve is returned to the normal open-center position.

2. The fluid pressure modulator of claim 1 further charcaterized by check valve means in said piston allowing fluid communication from the other side of said piston to said one side when unseated, said check valve means being unseated by differential pressure when said piston is fully withdrawn to allow communication of operating fluid to said one side of said piston and to said open-center hydraulic booster.

3. The wheel brake control system of claim 1 further characterized by said wheel condition sensing means providing an electric signal, and said modulator control valve means being a spring-centered solenoid actuated valve operated by said electric signal.

4. The wheel brake control system of claim 1 further characterized by a flow rate control valve controlling fluid flow from said other side of said piston to said modulator control valve to control the rate of movement of said piston in said one direction upon return of said modulator control valve to the normal open-center position.

References Cited

UNITED STATES PATENTS

| | | | |
|---|---|---|---|
| 3,401,982 | 9/1968 | Walker et al. | 303—21 F |
| 3,586,388 | 6/1971 | Stelzer | 303—21 F |
| 3,606,488 | 9/1971 | Beuchle et al. | 303—21 F |
| 3,610,702 | 10/1971 | MacDuff | 303—21 F |

MILTON BUCHLER, Primary Examiner

J. J. McLAUGHLIN, Assistant Examiner

U.S. Cl. X.R.

188—181 A; 303—10, 61